(12) United States Patent
Milrud

(10) Patent No.: US 11,126,603 B2
(45) Date of Patent: *Sep. 21, 2021

(54) CHANGE DATA CAPTURE USING NESTED BUCKETS

(71) Applicant: salesforce.com, inc., San Francisco, CA (US)

(72) Inventor: Boris Milrud, Castro Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,676

(22) Filed: Nov. 25, 2019

(65) Prior Publication Data
US 2020/0142873 A1 May 7, 2020

Related U.S. Application Data

(63) Continuation of application No. 15/418,520, filed on Jan. 27, 2017, now Pat. No. 10,489,366.

(51) Int. Cl.
*G06F 16/22* (2019.01)
*G06F 16/23* (2019.01)

(52) U.S. Cl.
CPC ...... *G06F 16/2228* (2019.01); *G06F 16/2291* (2019.01); *G06F 16/23* (2019.01); *G06F 16/2358* (2019.01); *G06F 16/2379* (2019.01)

(58) Field of Classification Search
CPC .. G06F 16/2228; G06F 16/2291; G06F 16/23; G06F 16/2358; G06F 16/2379; G06F 16/22; G06F 16/221; G06F 16/2219; G06F 16/2237; G06F 16/2246; G06F 16/2255; G06F 16/2264; G06F 16/2272; G06F 16/2282; G06F 16/25; G06F 16/21; G06F 16/211
See application file for complete search history.

(56) References Cited

U.S. PATENT DOCUMENTS

| | | | |
|---|---|---|---|
| 6,631,380 B1 | 10/2003 | Cason et al. | |
| 7,567,973 B1 * | 7/2009 | Burrows | G06F 16/22 |
| 7,584,204 B2 | 9/2009 | Capoor et al. | |
| 8,032,885 B2 | 10/2011 | Fish | |
| 9,372,889 B1 | 6/2016 | Jakobsson et al. | |

(Continued)

*Primary Examiner* — David T. Brooks
(74) *Attorney, Agent, or Firm* — Kowert, Hood, Munyon, Rankin & Goetzel, P.C.

(57) ABSTRACT

Systems and techniques are disclosed relating to management of a database. A method may include maintaining, by a computer system, a multi-tenant database operable to store a plurality of objects. Each object may be capable of including up to a maximum potential number of definable fields. Each field may have an associated index number that has been assigned sequentially. The method may include receiving user-defined data values for a subset of the maximum potential number of fields of a particular object, and storing, for the particular object, a boundary value indicating a range of index values that have been defined for the particular object. The method may further include, in response to determining that the particular object has been accessed, selectively processing a number of fields of the particular object. The number of fields may be determined based on the stored boundary value for the particular object.

20 Claims, 7 Drawing Sheets

Tenant Database 308

| Object | Boundary 320 | 0 | 1 | 2 | 3 | 4 | 5 | 6 | 7 | 8 | 9 | ... | 75 | 76 | 77 | 78 | 79 | 80 | ... | 93 | 94 | 95 | 96 | 97 | 98 | 99 |
|---|---|---|---|---|---|---|---|---|---|---|---|---|---|---|---|---|---|---|---|---|---|---|---|---|---|---|
| 310 | 99 | D | D | | D | | | D | | | | ... | D | D | D | D | | D | ... | | D | D | D | | | D |
| 311 | 97 | | D | D | | | D | D | | D | | ... | D | | D | | D | | ... | | | D | | D | | |
| 312 | 8 | D | | | D | D | | D | | D | | ... | | | | | | | ... | | | | | | | |
| 313 | 3 | | D | D | D | | | | | | | ... | | | | | | | ... | | | | | | | |
| 314 | -1 | | | | | | | | | | | ... | | | | | | | ... | | | | | | | |

Bucket 0   Bucket 1   Bucket 5

(56) References Cited

U.S. PATENT DOCUMENTS

| | | | |
|---|---|---|---|
| 2004/0194009 A1* | 9/2004 | LaComb | G06F 40/103 |
| | | | 715/239 |
| 2007/0011211 A1 | 1/2007 | Reeves et al. | |
| 2007/0033354 A1 | 2/2007 | Burrows et al. | |
| 2007/0244849 A1* | 10/2007 | Predovic | G06F 16/284 |
| 2009/0313287 A1* | 12/2009 | Koralski | G06F 40/18 |
| 2011/0173619 A1* | 7/2011 | Fish | G06F 16/2365 |
| | | | 718/101 |
| 2013/0007062 A1 | 1/2013 | Dutta et al. | |
| 2013/0124466 A1* | 5/2013 | Naidu | G06F 16/235 |
| | | | 707/610 |
| 2013/0173669 A1 | 7/2013 | Tang et al. | |
| 2015/0066884 A1 | 3/2015 | Tomarkin | |
| 2016/0055197 A1* | 2/2016 | Caro | G06F 16/2365 |
| | | | 707/695 |

* cited by examiner

FIG. 3

Tenant Database 308

| Object | Boundary 320 | 0 | 1 | 2 | 3 | 4 | 5 | 6 | 7 | 8 | 9 | ... | 75 | 76 | 77 | 78 | 79 | 80 | ... | 93 | 94 | 95 | 96 | 97 | 98 | 99 |
|---|---|---|---|---|---|---|---|---|---|---|---|---|---|---|---|---|---|---|---|---|---|---|---|---|---|---|
| 310 | 99 |  | D |  |  | D |  | D | D |  |  | ... | D | D | D |  |  | D | ... |  | D | D | D |  |  | D |
| 311 | 97 | D | D |  |  |  | D | D |  |  | D | ... | D |  |  | D |  |  | ... |  |  | D | D | D |  |  |
| 312 | 8 | D |  |  |  | D |  |  |  | D |  | ... |  |  |  |  |  |  | ... |  |  |  |  |  |  |  |
| 313 | 3 |  | D | D | D |  |  |  |  |  |  | ... |  |  |  |  |  |  | ... |  |  |  |  |  |  |  |
| 314 | -1 |  |  | D | D |  |  |  |  |  |  | ... |  |  |  |  |  |  | ... |  |  |  |  |  |  |  |

Index Number of Field

Bucket 0: indices 0–3
Bucket 1: indices 4–9
Bucket 5: indices 93–99

```
Integer Boundary_Index                                              400
String* Object[Field_0,Field_99]

if ( Boundary_Index >= 0 ) then
    evaluate Object[Field_0]
    evaluate Object[Field_1]
    ...
    evaluate Object[Field_4]
    if ( Boundary_Index >= 5 ) then
        evaluate Object[Field_5]
        evaluate Object[Field_6]
        ...
        evaluate Object[Field_9]
        if ( Boundary_Index >= 10 ) then
            evaluate Object[Field_10]
            evaluate Object[Field_11]
            ...
            evaluate Object[Field_24]
            if ( Boundary_Index >= 25 ) then
                evaluate Object[Field_25]
                evaluate Object[Field_26]
                ...
                evaluate Object[Field_49]
                if ( Boundary_Index >= 50 ) then
                    evaluate Object[Field_50]
                    evaluate Object[Field_51]
                    ...
                    evaluate Object[Field_74]
                    if ( Boundary_Index >= 75 ) then
                        evaluate Object[Field_75]
                        evaluate Object[Field_76]
                        ...
                        evaluate Object[Field_99]
                    end if;
                end if;
            end if;
        end if;
    end if;
end if
```

FIG. 4

Tenant Database 608

| Object | Boundary 620 | 0 | 1 | 2 | 6 | 4 | 65 | 66 | 67 | 68 | 69 | ... | 30 | 31 | 32 | 33 | 34 |
|---|---|---|---|---|---|---|---|---|---|---|---|---|---|---|---|---|---|
| 610 | 6 | D | D |   |   | D |   |   |   |   |   |   |   |   |   |   | D |
| 611 | 6 |   | D | D | D | D |   | D |   |   |   |   | D | D | D |   |   |
| 612 | 13 | D | D | D | D | D | D | D | D |   | D |   | D |   |   |   |   |
| 613 | 0 |   | D | D | D |   |   |   | D | D |   |   |   |   |   |   |   |
| 614 | 13 |   |   |   |   |   |   |   |   | D |   |   |   |   |   |   |   |

Index Number of Field

Bucket 0 — Bucket 13 — Bucket 6

FIG. 6

CHANGE DATA CAPTURE USING NESTED BUCKETS

The present application is a continuation of U.S. application Ser. No. 15/418,520, filed Jan. 27, 2017 (now U.S. Pat. No. 10,489,366), which is incorporated by reference herein in its entirety.

BACKGROUND

Technical Field

Embodiments described herein are related to the field of database computing systems, and more particularly to the implementation of change data capture processing.

Description of the Related Art

Cloud application development platforms, such as the Force.com multitenant architecture, may allow individual enterprises and software as a service (SaaS) vendors to develop robust, reliable, and Internet-scale applications. Web applications may generate various types of data, e.g., by accessing objects within a database and processing information accessed from the objects. In some databases, various objects may include varying amounts of data. Generating and maintaining some data may be computationally expensive. Data included in a particular object may be processed in response to certain accesses of the object by one or more users of the database.

BRIEF DESCRIPTION OF THE DRAWINGS

FIG. 3 depicts a table representing several objects in an embodiment of a tenant database.

FIG. 4 illustrates pseudo code for an embodiment of a change data capture routine operable on a database.

FIG. 6 illustrates a table representing several objects in another embodiment of a tenant database.

DETAILED DESCRIPTION

During operation, an object of a database may have more than one copy in various memory locations. For example, if two users are accessing a particular object, two copies of the object may be generated, one for each user to utilize. Any changes made by either used may be captured upon a user submitting the data or when the user logs off. In some embodiments, changes may be captured periodically while the two users are still operating on the object. Various processes for change data capture (CDC) may be utilized in different database systems. As used herein, CDC refers to processes for detecting a change in one or more data fields in a database object and determining which data fields have changed. Detected changes in a data field may require updating across multiple existing copies of the database object to provide coherent data to active users. As a number of objects in a database increases, with each object including multiple data fields, the CDC process may become cumbersome, requiring a significant amount of bandwidth from a computing system. Various embodiments are disclosed herein that may provide techniques for improving performance of CDC processes in regards to database management, possibly reducing a bandwidth required for a computing system to manage the database in comparison to other CDC techniques.

Figure 1:
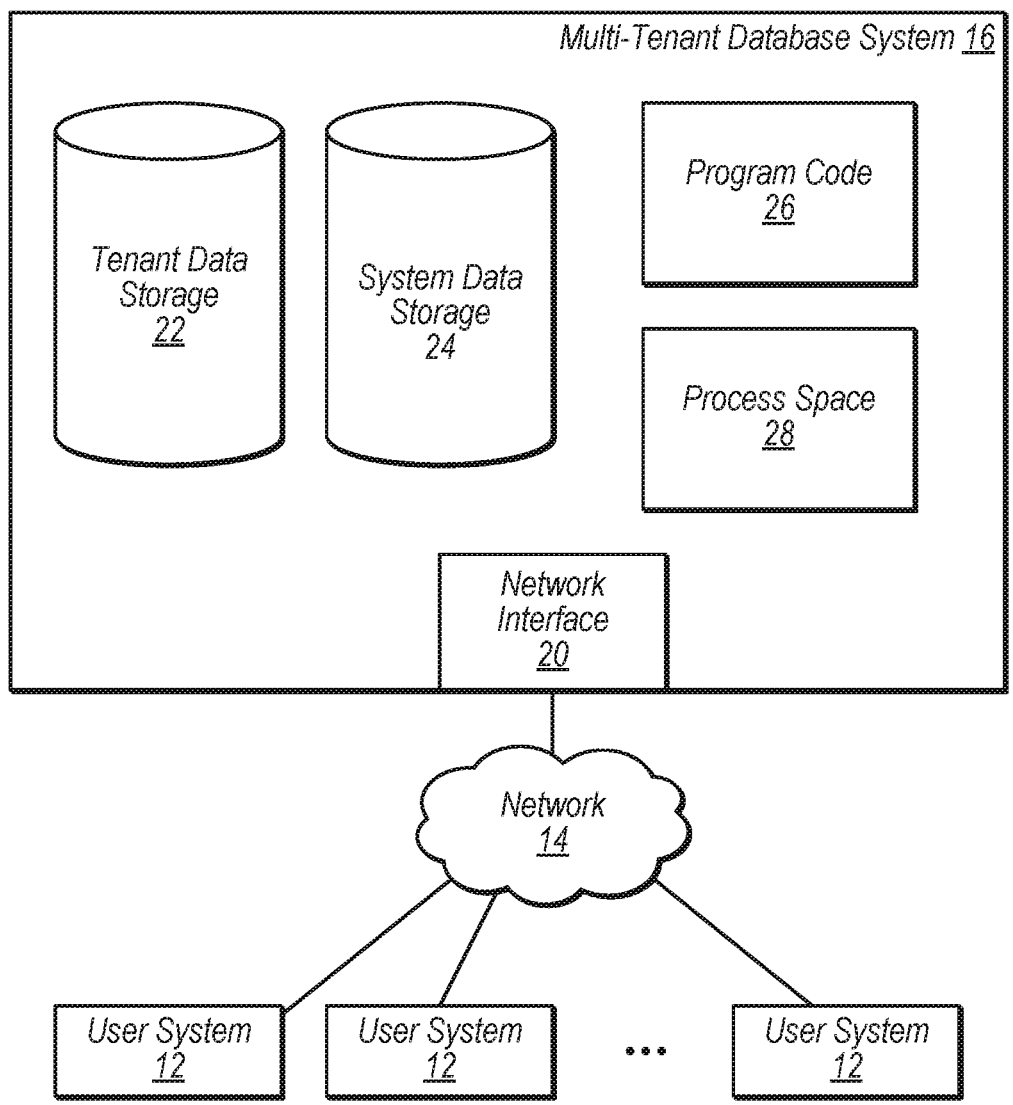
FIG. 1 illustrates a block diagram of an embodiment of a multi-tenant database system.

FIG. 1 illustrates a block diagram of an embodiment of a multi-tenant database system. Note that the disclosed multi-tenant system is included for illustrative purposes but are not intended to limit the scope of the present disclosure. In other embodiments, similar techniques may be implemented in non-multi-tenant environments such as, for example, various client/server environments, cloud computing environments, clustered computers, and the like. As shown in FIG. 1 (and in more detail in FIG. 2) one or more user systems 12 may interact via a network 14 with a multi-tenant database system (MTS) 16. The users of those user systems 12 may be users in differing capacities and the capacity of a particular user system 12 might be determined by the current user. For example, when a salesperson is using a particular user system 12 to interact with MTS 16, that user system 12 may have the capacities allotted to that salesperson. However, while an administrator is using the same user system 12 to interact with MTS 16, it has the capacities allotted to that administrator.

Network 14 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the present embodiment may utilize any of various other types of networks.

User systems 12 may communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such a server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 1 implements a web-based customer relationship management (CRM) system. For example, in some embodiments, MTS 16 includes application servers configured to implement and execute CRM software applications as well as provide related data, code, forms, web pages and other information to and from user systems 12 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 may include conventional, well-known elements that need not be explained in detail here. For example, each user system 12 may be a desktop personal computer, workstation, laptop, PDA, cell phone, or any WAP-enabled device or any other computing device capable of interfacing directly or indirectly to the Internet or other network connection. User system 12 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process, and view information and pages available to it from MTS 16 over network 14. Each user system 12 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 16 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, a LAN, a WAN, or the like.

In some embodiments, each user system 12 and its components are operator configurable using applications, such as a browser, that include computer code executable on one or more processing elements. Similarly, in some embodiments, MTS 16 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, a flash-based storage, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 16 is configured to provide web pages, forms, applications, data, and/or media content to user systems 12 to support the access by user systems 12 as tenants of MTS 16. As such, in this embodiment, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

It is noted that the embodiment of FIG. 1 is merely an example. The illustrated components are limited to those for describing the disclosed concepts. In other embodiments, additional components may be included.

Figure 2:
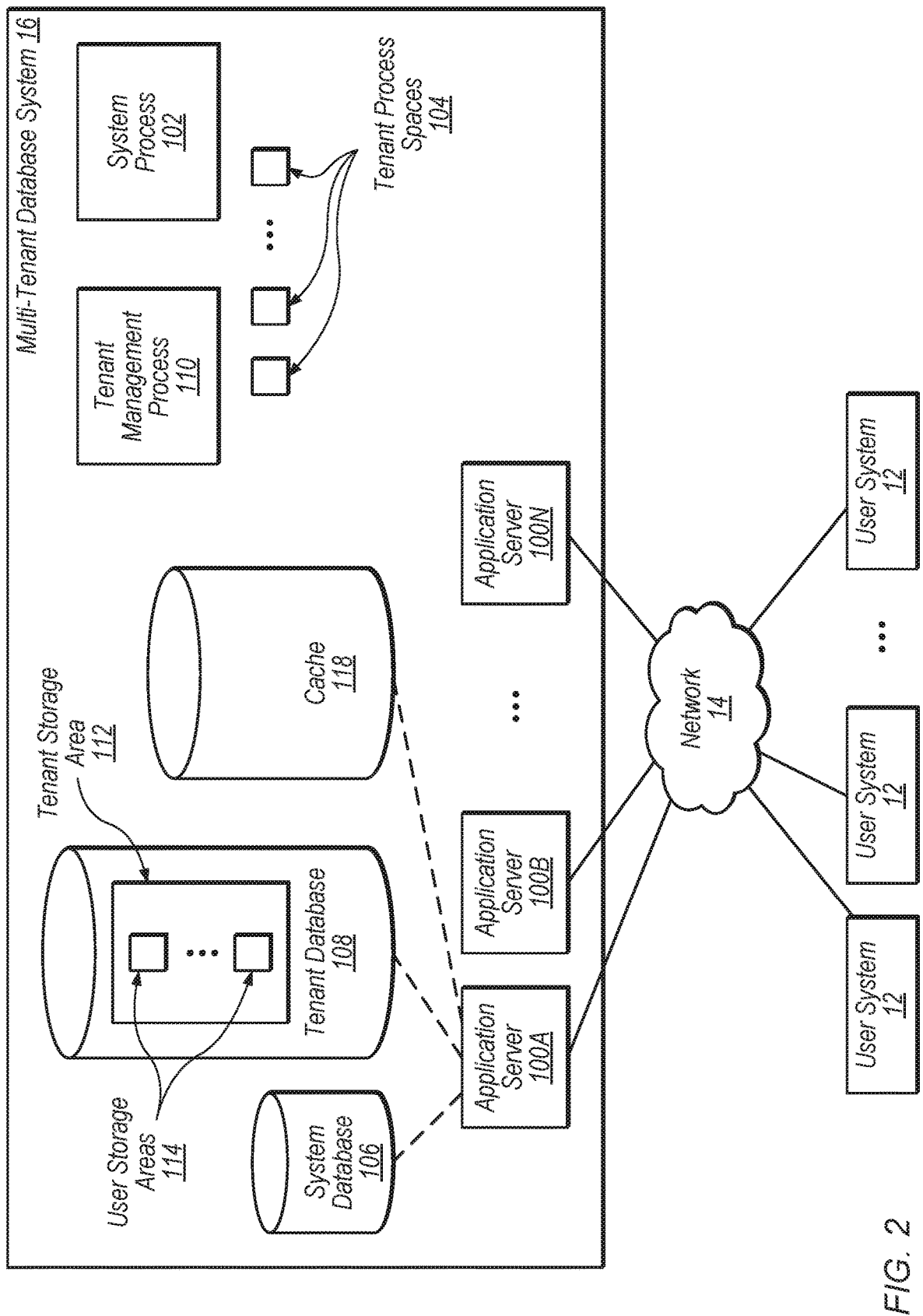
FIG. 2 shows is a block diagram of another embodiment of a multi-tenant database system.

Turning to FIG. 2, an embodiment of MTS 16 of FIG. 1 and various interconnections are shown with additional detail. In this example, the network interface is implemented as one or more HTTP application servers 100. Also shown is system process space 102 including individual tenant process spaces 104, a system database 106, tenant database(s) 108 and a tenant management process space 110. Tenant database 108 may be shared across application servers and may be divided into individual tenant storage areas 112, which can be either a physical arrangement or a logical arrangement. Within each tenant storage area 112, user storage 114 might be allocated for each user.

In the illustrated embodiment, each application server 100 also includes at least a portion of a cache 118. In some embodiments, user systems 12 that utilize web applications can request that data be stored in cache 118 (e.g., using a "put" operation) and later retrieve the data (e.g., using a "get" operation) rather than re-generating the data. In some embodiments, capacity limits may be assigned to different users/tenants/partitions, etc. and cached data may be evicted in order to remain below the allotted capacity. In some embodiments, cached data for a particular tenant is kept private from other tenants. Further, the visibility scope for cached data within a particular tenant may be configurable.

Each application server 100 may be communicably coupled to database systems, e.g., system database 106 and tenant database(s) 108, via, a different network connection. For example, application server 100A might be coupled via the Internet 14, application server 100B might be coupled via a direct network link, and application server 100N might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In the illustrated embodiment, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as are round robin and observed response time, also can be used. For example, in certain aspects, three consecutive requests from the same user could hit three different servers, and three requests from different users could hit the same server. In this manner, MTS 16 is multi-tenant, wherein the MTS 16 handles storage of different objects and data across disparate users and organizations.

As an example of storage, one tenant might be a company that employs a sales force where each salesperson uses MTS 16 to manage their sales process. Thus, a user might maintain contact data, leads data customer follow-up data, performance data, goals and progress data, all applicable to that user's personal sales process (e.g., in tenant database 108). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales for a given organization that is a tenant. Thus, there may be some data structures managed by MTS 16 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 16 might also maintain system level data usable by multiple tenants. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. In some embodiments, MTS 16 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table (referred to herein as a "database object" or simply "object") typically contains an instance of data for each category defined by the columns, referred to herein as a "data field" or "field." For example, a CRM database may include a table that describes a customer with columns for basic contact information such as name, address, phone number, fax number, etc. Another table may describe a purchase order, including columns for information such as customer, product, sale price, date, etc.

As a particular user accesses fields within one or more objects, a copy of the original object(s) may be generated for that user to manipulate, while protecting the integrity of the original data. At some point, for instance, if the user submits data for change, or if the user logs off, etc., the changed data may be captured in a CDC process to identify which fields of which objects have been changed. Changed fields may be updated within one or more storage locations. For example, a particular tenant database may have a main copy, and a back-up copy. In addition, a particular tenant database may have copies stored in multiple instances of MTS 16 in different cities. Using the CDC process, changed fields are identified and the updated information may be copied into various copies of the object in tenant database 108.

It is noted that the system of FIG. 2 is an example for demonstrative purposes. In other embodiments, any suitable number of application servers 100 and user systems 12 may be included. Additional components of MTS 16 may be included in some embodiments.

Moving to FIG. 3, a table representing several objects included in an embodiment of a tenant database is depicted. In the illustrated embodiment, five database objects are included, objects 310-314. Each of objects 310-314 includes a fixed number of available indexed fields, numbered 0-99. The indexed fields are subdivided into groups or buckets for processing. As used herein, a "bucket" refers to a subset of fields belonging to a common object. A bucket may include a subset of consecutively indexed fields that are processed as a group. Each of objects 310-314 additionally includes boundary index value (Boundary) 320.

The table of FIG. 3 corresponds to an embodiment of tenant database 308. Although five objects are shown in tenant database 308, any suitable number may be included, and the number may change over time as the tenant may add or delete objects as desired. Each object may be used by the tenant to store data corresponding to a common entity, such as a particular customer, project, or product, for example. In the embodiment shown, each field includes a number of fields, sequentially indexed 0 through 99. Thus, in this example, there are 100 potential fields (0-99) within an object that may be defined individually for each of objects 310-314. Of course, in other embodiments, the maximum number of fields may be higher or lower than 100. In certain implementations, the maximum number of possible user-defined fields may be over 800.

In FIG. 3, the "D" included for select indexed fields 0-99 indicates that the corresponding field 0-99 is defined for the respective object 310-314. For example, fields 1, 2, 5, 6, 9, 75, 77, 79, 95, and 97 are shown as defined for object 311. A lack of a "D" for a given field 0-99 indicates the given field is currently undefined or unused for the respective object 310-314. It is noted that fields for a particular object 310-314 may not be defined sequentially and gaps may be present between successively defined fields 0-99. For example, object 310 includes gaps between defined fields 1 and 4, as well as between 4 and 7, and between 96 and 99, among other gaps.

The boundary index 320 column may be used to store information used by MTS 16, in FIGS. 1 and 2, particular to the respective object 310-314. The number shown in the boundary index 320 column corresponds to one piece of metadata information, a boundary index value 320 for the respective object 310-314. In this example, the boundary index value 320 indicates the highest index number for a defined field in the respective object 310-314. Object 310's highest user-defined field has an index number of 99, while object 311's highest user-defined field has an index number of 97. Similarly, the highest index number for object 312 is 8 and for object 313 it is 3 (assuming no fields are defined between fields 9 and 75 or between fields 80 and 93 for objects 312 and 313). Object 314 has no defined fields 0-99 (e.g., object 314 may be a newly created object that hasn't been populated with fields, or has recently been depopulated with all fields 0-99 cleared). Boundary index value 320 for object 314 may be set to a negative number (−1 in this example) to indicate that no fields 0-99 are currently defined. Additional information may be included in metadata in other embodiments, such as, for example, a count of defined fields, a lowest index number for a defined field, and the like. In general, the boundary value for a particular object thus indicates a range of fields that have been defined for that object. As indicated, this range may include some fields that are not defined, but the boundary value still indicates a range within which defined fields fall. Thus, if a boundary value for a potential 100-field object is 44, this may indicate that all defined fields are between 0 and 44, or stated another way, none of fields 45 to 99 are defined.

In the illustrated embodiment, after a user accesses an object 310-314, a CDC process may be executed to determine which, if any, of fields 0-99 of the respective object 310-314 have been modified. Processing every field 0-99 in every object 310-314 may result in a significant number of wasted processing cycles by a processor in MTS 16 as it attempts to process undefined fields. On the other hand, using metadata to maintain a list of every defined field for each object (e.g. a bit vector) may result in an excessive amount of additional metadata information to store and maintain.

The CDC in the illustrated embodiment utilizes the boundary index value 320 along with the predefined buckets to potentially limit a number of fields 0-99 that are processed for each object 310-314. MTS 16 thus may execute a CDC process in which boundary index value 320 is compared to a bucket index value in a particular bucket. In the current example, the bucket index value corresponds to the first index number in a particular bucket. For example, to process object 310, MTS 16 may execute a CDC routine that compares boundary index value 320 (i.e., 99) to an index number in bucket 0 (e.g., 0). Because the value (99) of boundary index value 320 is greater than the bucket 0 index of 0, the CDC routine proceeds to process each of fields 0-4 in bucket 0 for object 310. After bucket 0 is processed, the CDC routine moves to the next bucket, bucket 1. Boundary index value 320 (99) is again compared to an index number in bucket 1 (here, the bucket index is 5). Again, because the value (99) of boundary index value 320 exceeds the bucket 1 index of 5, fields corresponding to bucket 1 (fields 5-9) are processed. This process repeats until either the value (99) of boundary index value 320 does not exceed a given bucket's index value, or all fields have been processed.

As another example, applying this exemplary CDC routine to object 313, the value of 3 for boundary index value 320 for object 313 is compared to the index value of the fields in bucket 0 (i.e., 0). Because the value of 3 is greater than the bucket index value of 0, fields 0-4 in bucket 0 are therefore processed. Next, the CDC routine compares the boundary index value 320 of 3 to the bucket 1 index value of 5. Since 3 is less than 5, none of the fields in bucket 1 are processed. Indeed, none of the remaining fields above index 4 (fields 5-99) are processed, concluding the CDC routine. By ending the processing after processing only the fields in bucket 0, processing cycles may be saved and, for example, applied to other tasks in MTS 16.

In the illustrated examples, processing of fields started with index number 0 and proceeded, as necessary, to index number 99. It is contemplated that other processing orders may be utilized in other embodiments. For example, the CDC routine might start with the highest index number (i.e., 99) and proceed down to index number 0. In such an embodiment, the lowest index number for a defined field 0-99 may be stored in boundary index value 320 and utilized by the CDC routine. Additionally, in such an embodiment, an index value for the buckets may correspond to the highest index value in a particular bucket. Thus, the boundary value may indicate a range of values that are user-defined for a particular object by indicating a value corresponding to the highest-defined or in some cases lowest-defined field for that object.

Turning now to FIG. 4, pseudo code for an embodiment of a CDC routine operable on a database is illustrated. CDC routine 400 may be included as a part of program code 26 in FIG. 1, and executed by processors in MTS 16 to perform a CDC process on a tenant database, such as, for example, tenant database 308 in FIG. 3. CDC routine 400 may receive two variables, "Boundary_Index" and "Object." In the illustrated embodiment, Boundary_Index corresponds to boundary index value 320 for a given one of objects 310-313. Object corresponds to one of the objects in tenant database 308, such as one of objects 310-314. In FIG. 4, Object is defined as an array of strings for clarity. However, in other embodiments, Object may have any suitable constituent data types.

Referring collectively to FIGS. 3 and 4, CDC routine 400 begins by comparing Boundary_Index to a first constant value, "0." In the illustrated embodiment, this constant value corresponds to the first index number in bucket 0, as shown in FIG. 3. If Boundary_Index is greater than or equal to 0, then CDC routine proceeds to evaluate the fields of bucket 0, namely fields 0 through 4 of Object. The evaluation may consist of any suitable operations for determining if the corresponding field value has changed. Otherwise, if Boundary_Value is less than 0 (e.g., −1 as for object 314), then CDC routine 400 ends, and no fields are evaluated and no further comparisons are made between Bounday_Index and remaining buckets.

If Boundary_Index is greater than 0, then, after the fields in bucket 0 are evaluated, then Boundary_Index is compared to 5, the first index value in bucket 1. Again, if Boundary_Index is greater than or equal to 5, the fields of bucket 1 (i.e., fields 5-9) are evaluated. Otherwise, CDC routine 400 ends. CDC routine 400 repeats this process, comparing Boundary_Index to a first index value in subsequent buckets and evaluating the fields in the corresponding bucket if Boundary_Index is greater than or equal to the first index of the bucket, and ending the routine if Boundary_Index is less than the first index value.

It is noted that, in the illustrated embodiments of FIGS. 3 and 4, the various buckets are not always equal in the number of fields per bucket. The first bucket includes fields 0-4, and the second bucket includes fields 5-9. The third bucket, however, includes fields 10 through 24 and the next illustrated bucket includes fields 25-49. The fields of objects 310-314 may be divided into buckets of any suitable size, using any pertinent metrics to determine the size of each bucket. For example, the starting and ending index values for a particular bucket may be selected based on a statistical analysis of one or more objects in a particular tenant database or over a range of various tenant databases. In various embodiments, the buckets may be all the same size, each bucket a different size, or a combination thereof.

In one embodiment, for example, 801 fields may be included in each database object. These 801 fields may be organized into six buckets with 21 fields in the first bucket, 30 fields in the second bucket, 50 fields in the third bucket, 100 fields in the fourth bucket, 200 fields in the fifth bucket, and 400 fields in the sixth bucket. In such an embodiment, if half of the objects in the database only have user-defined fields in the first three buckets, then a considerable number of processing cycles may be saved by only processing 101 fields rather than 801 fields for half of the objects in the database.

It is also noted that the pseudo code of FIG. 4 is an example for demonstrating disclosed concepts. In other embodiments, CDC code may include additional decision (e.g., "if/then) statements and may receive additional variables for executing the CDC routine.

Figure 5A:
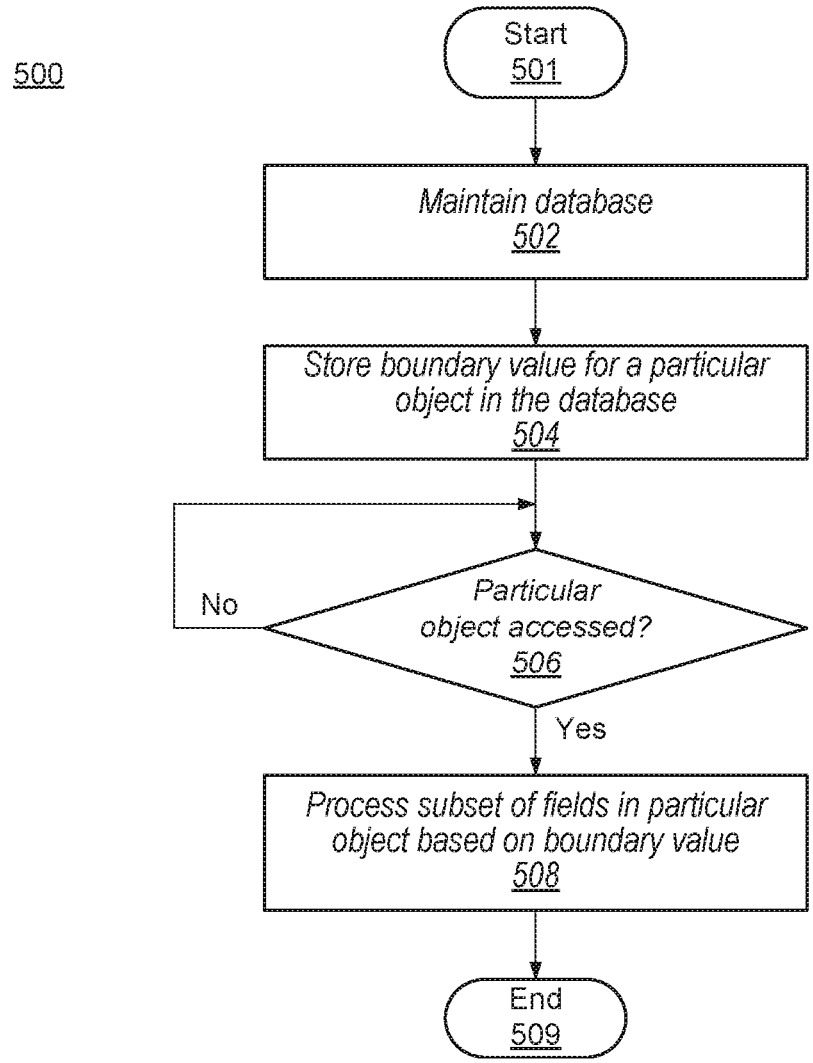
FIG. 5A shows a flow diagram for an embodiment of a method for performing change data capture in a database.

Moving now to FIG. 5A, a flow diagram for an embodiment of a method for performing change data capture in a database is shown. Method 500 of FIG. 5 may be applicable to a multi-tenant database system, such as, e.g., MTS 16 of FIGS. 1 and 2, acting upon a tenant database, such as tenant database 308 of FIG. 3, for example. Referring collectively to FIGS. 2, 3, and 5, the method begins in block 501.

A database system maintains a database (block 502). MTS 16 maintains tenant database 308. Tenant database 308 includes objects 310-314 that may each correspond to a particular customer, project, product, or the like, for the corresponding tenant. The tenant may, as part of their usage of tenant database 308, generate new or modify existing objects 310-314. Each object 310-314 includes fields 0-99, each of which may or may not be defined by the tenant.

A boundary value is stored corresponding to a particular object in the database (block 504). In the illustrated embodiment, a boundary value 320 is stored that corresponds to a newly generated object, such as, for example object 312. In some embodiments, boundary value 320 may be stored once, in response to defining a new object. In other embodiments, boundary value 320 may updated in response to a new field being defined within the object. The boundary value 320 for object 312 corresponds to a highest index value for a defined field. In tenant database 308, field 8 has the highest index value of the five defined fields (assuming no fields are defined between fields 9 and 75 or between fields 80 and 93), and boundary value 320 is, therefore, set to 8. It is noted however, that in other embodiments, the boundary value may be selected by a different method, such as a lowest index value, for example.

Further operations of method 500 may depend on a determination if the particular object has been accessed (block 506). A CDC routine may be executed in response to object 312 being accessed. In some embodiments, the CDC routine may instead, or in addition, be executed periodically at an interval determined by a process running on MTS 16. If object 312 has been accessed (or if a given time interval has elapsed) then the method moves to block 508 to process a subset of fields 0-99. Otherwise, the method remains in block 506.

A subset of fields included in the particular object is processed (block 508). A subset of fields to process is determined based on the value of boundary value 320 for object 312. In the illustrated embodiment, the subset of fields includes the fields in each of buckets 0-5 that include an index value that is less than or equal to boundary value 320. In various other embodiments, the subset of fields may include fields with index values that are greater than or less than boundary value 320. Processing may include actions to determine if any of the subset of fields has been modified in comparison with other copies of object 312. Other copies of object 312 may include, in various embodiments, archived copies stored in a non-volatile memory, copies currently in use by a different user of the same tenant data base 308, cached copies stored in one or more RAMs, and the like. In some embodiments, processing may additionally or alternatively include actions associated with searching for a particular value in one or more fields of object 312. The method returns to block 512 to compare the boundary value 320 to a next threshold value.

It is noted that Method 500 is presented as an example embodiment. In other embodiments, a different number of operations may be included. In some embodiments, actions may be executed in a different order.

Figure 5B:
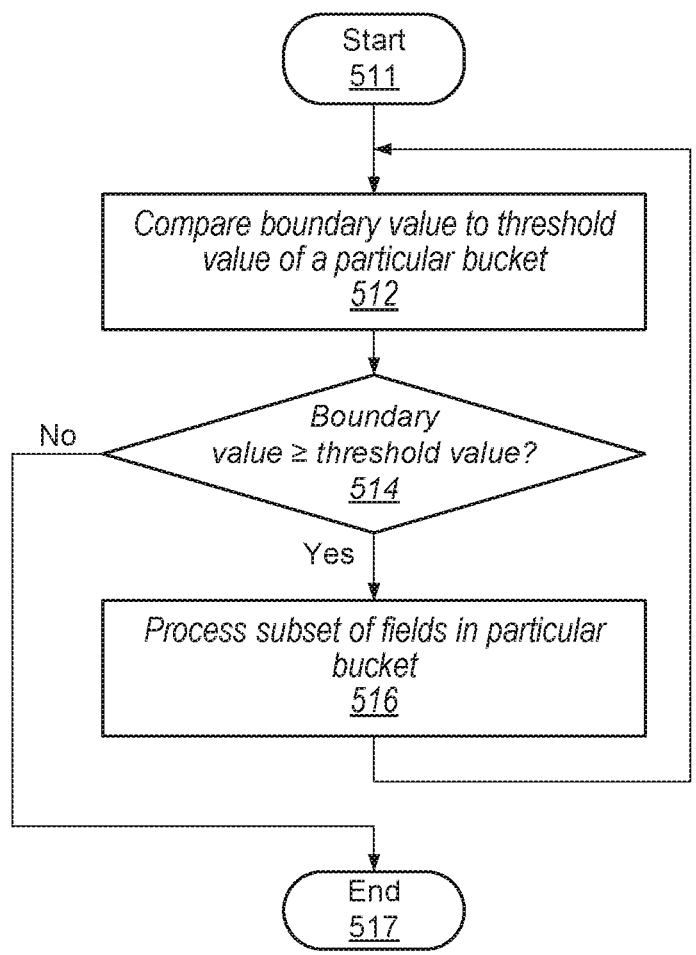
FIG. 5B depicts a flow diagram for an embodiment of a method for identifying subsets of fields in a database to process while performing change data capture.

Turning to FIG. 5B, a flow diagram for an embodiment of a method for identifying subsets of fields in a database to process while performing change data capture is depicted. Method 510 of FIG. 5B may be applicable to a multi-tenant database system, such as, e.g., MTS 16 of FIGS. 1 and 2, acting upon a tenant database, such as tenant database 308 of FIG. 3, for example. In some embodiments, Method 510 may correspond to operations associated with block 508 of Method 500 in FIG. 5A. Referring collectively to FIGS. 2, 3, and 5B, the method begins in block 511.

The boundary value is compared to the threshold value associated with a particular bucket (block 512). Boundary value 320 for object 312 is compared to a threshold value corresponding to a particular bucket of fields 0-99. For example, buckets may be processed serially, starting with bucket 0 and progressing up towards bucket 5 each time block 508 is performed, until method 500 ends. The threshold value, in the illustrated embodiment, corresponds to a first field in a given bucket. If bucket 0 is being processed, then the threshold value is "0," corresponding to field 0, the first field in bucket 0. If, however, bucket 5 is being processed, then the threshold value is "75," corresponding to field 75, the first in bucket 5.

Proceeding operations of the method may depend on a value of the boundary value (block 514). Based on the comparison of boundary value 320 to the threshold value of the currently processed bucket, a determination is made if fields in the current bucket are to be processed. If boundary value 320 is greater than or equal to the threshold value, then the method moves to block 516 to process the fields included in the current bucket. Otherwise, the method ends in block 517.

A subset of fields included in the particular bucket is processed (block 516). The subset of fields that are included in the current bucket (e.g., fields 0-4 for bucket 0, or fields 75-99 for bucket 5) are processed. In the illustrated embodiment, processing includes a determination if any of the subset of fields has been modified in comparison with other copies of object 312. In various embodiments, other copies of object 312 may include cached copies stored in one or more RAMs, archived copies stored in a non-volatile memory, copies currently in use by a different user of the same tenant data base 308, and the like. In some embodiments, processing may additionally or alternatively include actions associated with searching for a particular value in one or more fields of object 312. In other embodiments, processing may correspond to collecting statistical information related to one or more fields of object 312. The method returns to block 512 to compare the boundary value 320 to a next threshold value.

It is noted that Method 510 is an example to demonstrate disclosed concepts. In some embodiments, operations may be performed in another order. In other embodiments, a different number of operations may be included.

Proceeding to FIG. 6, a table representing several objects included in another embodiment of a tenant database is illustrated. Tenant database 608 is similar to tenant database 308 in FIG. 3. Tenant database 608 depicts a different organization of the fields as compared to tenant database 308. Similar to tenant database 308, five database objects are included in tenant database 608, objects 610-614. Each of objects 610-614 includes a fixed number of available indexed fields, with numbers 0-69 shown, although additional fields may be included. The indexed fields are again subdivided into buckets for processing. Each of objects 310-314 additionally includes boundary index value (Boundary) 620.

In the illustrated embodiment, the buckets that subdivide fields 0-69 are arranged differently than those in FIG. 3. This arrangement may include a different physical order of storing the fields in, for example, tenant database 108, or may be a logical reordering of a same physical storage order used for tenant database 308. In some embodiments, the order of fields for tenant database 308 may be re-arranged to the order shown in FIG. 6. For example, buckets and their corresponding included fields may be arranged in an order based on their relative usage. In other words, buckets with a higher percentage of fields defined may be grouped at a beginning of a logical arrangement while buckets with lower percentage of defined fields. In the illustrated embodiment, bucket 0 has 12 of 25 fields defined, bucket 13 has 7 of 25 fields defined and bucket 6 has 5 of 25 fields defined. The buckets are, therefore, arranged with bucket 0 first, bucket 13 next and bucket 6 last. Such an arrangement may reduce a number of processing cycles that a multi-tenant data base system, such as, e.g., MTS 16 in FIGS. 1 and 2, uses to perform a CDC, or other type of database management routine by concentrating the defined fields in buckets that are processed first.

Additionally, in one embodiment, boundary value 620, instead of storing a highest index value as shown in FIG. 3, may store a number corresponding to a bucket. The selected bucket may contain the last defined field for the corresponding object 610-614. For example, boundary value 620 for object 610 is set to 6 to indicate that the respective last defined field (i.e., field 34) is in bucket 6. Likewise, the boundary value 620 for object 614 is set to 13, indicating that the respective last defined field (i.e., field 68) is in bucket 13. In such embodiments, boundary value 620 may be compared to the bucket number of a currently processed bucket, rather than an index number of a field in the currently processed bucket as was described above in the method of FIG. 5. Use of the bucket number as boundary value 620 is presented as an example. In other embodiments, boundary value 620 may be set using an index value of a particular field as was disclosed in FIG. 3.

Tenant database 608 may be used in conjunction with method 500 of FIG. 5 in a similar manner as tenant database 308. In some embodiments, boundary value 620 and/or the bucket numbers may be used in a calculation or a lookup table to generate an intermediate number that is used to determine a last bucket to process during an application of method 500.

It is noted that tenant database 608 of FIG. 6 is merely an example to demonstrate one possible variation of the disclosed concepts. In other embodiments, any suitable arrangement of objects may be implemented. Although 70 fields are shown, any suitable number of fields, may be included for each object. Any suitable number of buckets may be utilized in various embodiments. In various embodiments, the total possible number of fields may be fixed or may differ between objects.

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processor" refers to various elements or combinations of elements configured to execute program instructions. Processors include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

This specification includes references to "one embodiment," "other embodiments," "some embodiments," or "an embodiment." The appearances of these phrases do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
maintaining, by a computer system, a database operable to store a plurality of objects such that each object is capable of including up to a maximum number of definable fields;
receiving, by the computer system, user-defined data values for a subset of the maximum number of definable fields for a particular object in the database;
storing, by the computer system for the particular object, a boundary value indicating a last defined field of the subset of the maximum number of definable fields for the particular object; and
in response to determining that the particular object has been accessed, processing the particular object using a series of buckets, beginning with an initial bucket, and wherein each bucket corresponds to at least two of the maximum number of definable fields;
wherein processing the particular object includes operating on fields of the particular object that correspond to buckets from the initial bucket to a bucket indicated by the boundary value, and wherein the processing is performed without operating on fields within remaining buckets that are not included by the boundary value.

2. The method of claim 1, wherein processing the particular object includes identifying a particular bucket of the series of buckets as a final bucket for processing the particular object by determining, based on the boundary value, that the last defined field corresponds to the particular bucket.

3. The method of claim 1, wherein operating on fields of the particular object that correspond to a given bucket of the series of buckets includes:
comparing the boundary value to a range of field indexes associated with the given bucket; and
in response to determining that a smallest field index in the range of field indexes is less than or equal to a field index of the last defined field, processing those fields of the particular object that correspond to the given bucket.

4. The method of claim 3, further comprising, for a subsequent bucket that follows the given bucket:
in response to determining that a smallest field index in a range of field indexes associated with the subsequent bucket is greater than the field index of the last defined field, ceasing further processing of the particular object.

5. The method of claim 3, wherein, for a final bucket of the series of buckets, one or more fields included in the final bucket are undefined based on not receiving user-defined data values for those fields.

6. The method of claim 1, wherein an order for each bucket within the series of buckets is determined using a statistical analysis of one or more of the plurality of objects that are similar to the particular object.

7. The method of claim 1, wherein a size for each bucket of the series of buckets is determined using a statistical analysis of one or more of the plurality of objects that are similar to the particular object.

8. The method of claim 1, wherein operating on a given one of the definable fields includes identifying a stored user-defined data value that has been modified in association with the access of the particular object.

9. A non-transitory computer-readable medium having instructions stored thereon that are executable by a computing device to perform operations comprising:
accessing a database that is operable to store a plurality of objects, wherein each object is capable of including up to a maximum number of definable fields;
defining a subset of the maximum number of definable fields in a particular object in the database by storing user-defined data values into the subset of fields;
storing, for the particular object, a boundary value indicative of a last defined field of the subset of fields for the particular object; and
in response to determining that the particular object has been accessed, processing the particular object using a series of buckets, beginning with an initial bucket, and wherein each bucket is associated with two or more of the maximum number of definable fields;
wherein processing the particular object includes operating on fields of the particular object that correspond to buckets from the initial bucket to a bucket indicated by the boundary value, without operating on fields within remaining buckets that are not included by the boundary value.

10. The non-transitory computer-readable medium of claim 9, wherein each definable field of the particular object is assigned a respective index value, and further comprising storing an index value corresponding to the last defined field as the boundary value.

11. The non-transitory computer-readable medium of claim 10, wherein operating on fields of the particular object associated with a given bucket of the series of buckets includes, in response to determining that a smallest index value associated with the given bucket is less than or equal to a field index of the last defined field, operating on those fields associated with the given bucket.

12. The non-transitory computer-readable medium of claim 11, further comprising, in response to determining that a smallest index value associated with a different bucket is greater than the field index of the last defined field, ceasing further processing of the particular object.

13. The non-transitory computer-readable medium of claim 9, wherein one or more fields associated with a particular bucket are undefined, and wherein operating on the fields included in the particular bucket includes operating on all fields included in the particular bucket.

14. The non-transitory computer-readable medium of claim 9, wherein each definable field of the particular object is assigned a respective index value, and further comprising:
determining a bucket of the series of buckets that corresponds to an index value of the last defined field of the subset of fields; and
storing an identifier corresponding to the determined bucket as the boundary value.

15. A system comprising:
a memory; and
a processor configured to execute program instructions stored in the memory, the program instructions causing the processor to:
define, based on user input, a subset of fields from a maximum number of definable fields in a particular object of a plurality of objects in a database;
store, in the particular object, a boundary value indicative of a last defined field of the subset of fields for the particular object; and
in response to a determination that the particular object has been accessed, process the particular object by operating on one or more buckets of the definable fields, beginning with an initial bucket, wherein each bucket is associated with two or more of the definable fields;

wherein processing the particular object includes operating on fields of the particular object that correspond to buckets from the initial bucket to a bucket indicated by the boundary value and excluding remaining buckets that are not included by the boundary value.

16. The system of claim 15, wherein to process the particular object, the program instructions further cause the processor to:

compare the boundary value to a smallest field index associated with a particular bucket of the one or more buckets; and in response to a determination that the smallest field index is less than or equal to a field index of the last defined field, process those fields in the particular bucket.

17. The system of claim 16, wherein the program instructions further cause the processor to:

compare the boundary value to a different smallest field index associated with a different bucket of the one or more buckets; and in response to determining that the different smallest field index is greater than the field index of the last defined field, cease additional processing of the particular object.

18. The system of claim 15, wherein the program instructions further cause the processor to:

assign a respective field index to each definable field of the particular object; and store a field index corresponding to the last defined field as the boundary value.

19. The system of claim 15, wherein the program instructions further cause the processor to:

assign a respective field index to each definable field of the particular object;

identify a bucket of the one or more buckets that corresponds to a field index corresponding to the last defined field; and store an identifier corresponding to the identified bucket as the boundary value.

20. The system of claim 19, wherein to process the particular object, the program instructions further cause the processor to operate on those fields in a particular bucket in response to a determination that an identifier for the particular bucket is less than or equal to the boundary value.

* * * * *